July 4, 1950  F. G. PATTERSON  2,513,962
DIRECTIVE RADIANT ENERGY OBJECT LOCATING SYSTEM
Filed May 9, 1944
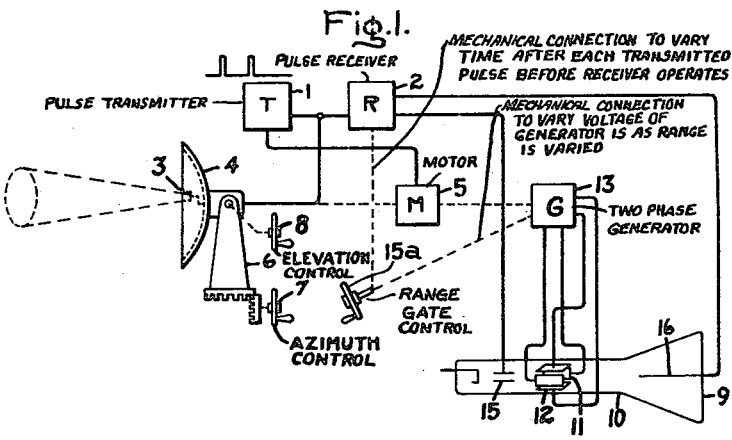
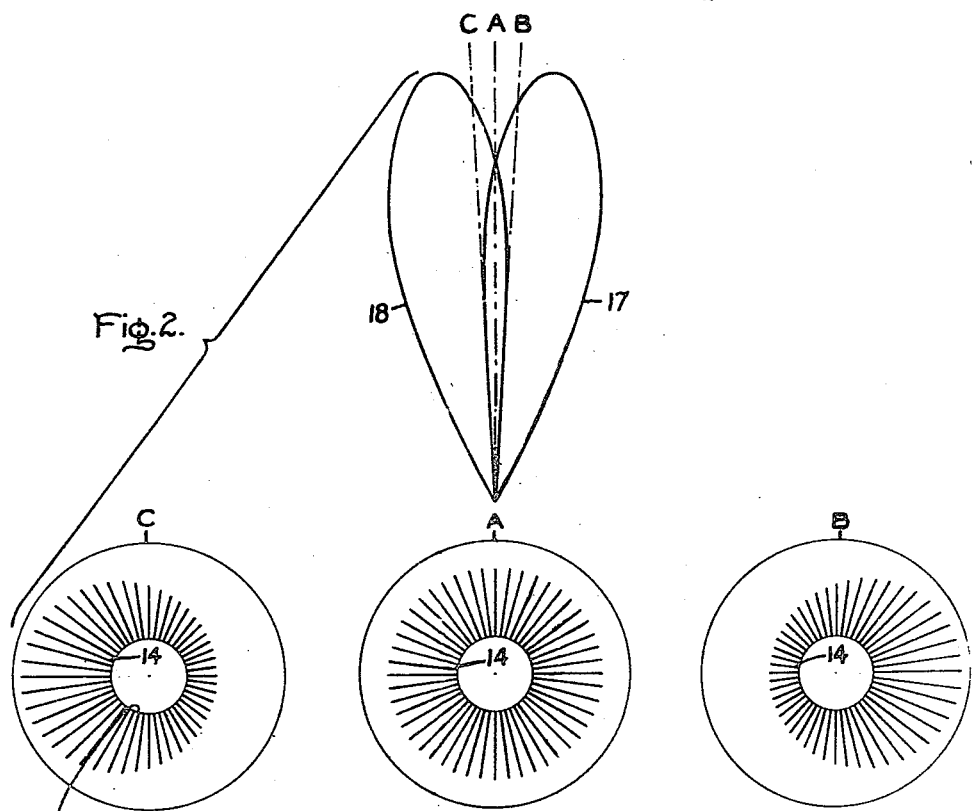
DIAMETER OF CIRCULAR TRACE
14 IS PROPORTIONAL TO
OBJECT RANGE
Inventor:
Franklin G. Patterson,
by Harry E. Dunham
His Attorney.

UNITED STATES PATENT OFFICE 2,513,962

DIRECTIVE RADIANT ENERGY OBJECT LOCATING SYSTEM

Franklin G. Patterson, Schenectady, N. Y., assignor to General Electric Company, a corporation of New York Application May 9, 1944, Serial No. 534,739

8 Claims. (Cl. 343—11)

The present invention relates to directive radiant energy object locating equipment and is particularly concerned with a system for indicating the direction of a remote energy-reflecting object.

A main object of my invention is to provide an improved representation of the accuracy with which a pulse-echo locating equipment is pointed at a remote energy-reflecting object.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a diagram of locating equipment embodying my invention and Fig. 2 is a diagram illustrating the operation.

Referring to the drawing there is shown radio locating equipment comprising a transmitter 1 for transmitting pulses of radio waves at the desired repetition rate (e. g., 2000/sec.) and a receiver 2 for echoes or reflections of the transmitted pulses from remote objects. The transmitter and receiver are connected to a directional antenna system comprising a dipole 3 rotated about the axis of a parabolic reflector 4 by a motor 5, synchronously with a submultiple of the repetition rate (e. g., 40 cycles, 2400 R. P. M.) Since the dipole is displaced from the axis of the reflector, the axis of maximum sensitivity (the directive axis) of the antenna system rotates about the reflector axis at motor speed (e. g., 40 R. P. S.) so the antenna system scans a conical field centered on the reflector axis, or axis of orientation of the equipment. During each revolution of the dipole, a large number of echoes (e. g., 50) are received from each object within the conical field and the echoes vary in strength with the angular displacement of the object from the reflector axis. If the remote object lies on the reflector axis, which may be termed the mean axis of the equipment, the echoes will be of the same strength independent of the instantaneous position of the dipole. If the object is displaced from the reflector axis, the strongest echo will be received when the instantaneous position of the dipole is in the direction of the displacement (when the object is nearest the instantaneous directive axis of the antenna system), and the echo strength will vary sinussoidally to a minimum strength when the instantaneous position of the dipole is 180 degrees from the position of maximum echo strength (when the object is farthest from the instantaneous directive axis of the antenna system). This arrangement is known in the art as "conical scan" because the axis of maximum directivity of the antenna system transcribes the surface of a cone. Other equivalent arrangements have been developed.

The reflector 4 is mounted on a horizontal axis through a pedestal 6 supported for rotation about a vertical axis so the reflector axis can be varied in azimuth and elevation to point at a remote object. The azimuth and elevation controls, which may be manual or automatic, are indicated as hand wheels 7 and 8. The direction of the reflector axis is indicated by the position of the azimuth and elevation controls to a degree of accuracy dependent upon the construction of the controls.

The direction of the remote object is presented on the viewing screen 9 of a cathode ray tube 10 having horizontal and vertical deflection plates 11, 12 supplied from a two-phase generator 13 driven by the motor 5 so as to supply voltage of the same frequency as the rotation of the dipole 3 (e. g., 40 cycles). The generator voltages, being of equal magnitude but differing in phase by 90 degrees, cause deflection of the beam of the cathode ray tube in circular sweep trace 14 having a diameter proportional to the magnitude of the generator voltages. The construction and operation of such a sweep generator will be readily apparent to those skilled in the art without detailed illustration, since circular sweeps for cathode ray tubes have been known for many years and commonly employed in pulse echo locating systems. See for example, Patent 1,924,156—Hart, issued August 29, 1933, and Patent 2,408,414—Donaldson, filed June 19, 1939 and issued October 1, 1946. Therefore, generator 13 is indicated only diagrammatically, since there are many obvious ways in which the amplitude of the circular sweep voltages may be controlled by a shaft rotation. By means of centering voltages, not shown, the circular sweep trace is centered at a point on the viewing screen representing the mean axis of the equipment. The instantaneous position of the beam on the circular sweep trace corresponds to the instantaneous position of the directive axis of the antenna system, or, in other words, to the scanning position of the antenna system.

An indication of the relative strength of the echoes received in the successive scanning positions of the antenna system is obtained by applying the echo voltages from the receiver output between the main anode 16 of the cathode ray tube and a center electrode 18 extending inward from the viewing screen along the axis of the cathode ray tube. The echoes from a particular object are segregated by operation of a range gate control handwheel 15a which controls range gating circuits in receiver 2 so as to supply the received signals to the receiver output only during the intervals when echoes from a particular object, or range, are being received. That is, the receiver 2 is normally blocked from supplying echo signals to the cathode ray tube 10 and is gated on only for a short time interval delayed by a selectable time after each transmitted pulse, this delay time being variable under the control of handwheel 15a. If the object is moving relative to the equipment, the range gate is adjusted to correspond with the instantaneous range of the object. Various suitable range gating systems for pulse receivers are known to the art. For example, typical range gating control mechanism and circuits are shown and described in Patent 2,455,265—Norgaard, issued November 30, 1948, and assigned to the same assignee as the present invention. As shown in that patent, a manually-controlled phase shifter controls the time phase of range gate, or aperture, pulse with respect to the transmitted pulses; and these gate pulses are employed to unblock an amplifier in the receiving channel for a short time interval which may be adjusted to include a desired echo. Therefore, the receiver 2 has been represented only diagrammatically and may be understood as including any equivalent phase shifting and gating means, whose operation is controlled by a mechanical connection from the shaft carrying range gate control hand wheel 15a. If desired, the range gate control hand wheel 15a may simultaneously control the voltages applied to the plates 11 and 12 inversely with range so the diameter of the circular sweep trace 14 provides a visual indication of the range of the object. This may be effected by any suitable known voltage-control means for generator 13, operated by rotation of hand wheel 15a. Therefore, a mechanical connection is merely indicated schematically from the shaft carrying hand wheel 15a to generator 13. The echo voltages are applied in a sense to cause radially outward deflection of the beam proportional to the magnitude of the echo voltages. Other ways of obtaining the radial deflections are known. The radial deflections start at the instantaneous positions of the beam on the circular sweep trace 14 and the resultant image on the screen resembles a wheel having spokes varying in length in accordance with the echo strength at the respective scanning positions of the antenna system. Since the rotation of the dipole is in a fixed relation to the repetition rate, the pulses will occur at the same phase position of the antenna on successive revolutions and will originate at the same position on the circular image representing the antenna position. They will thus build up a persistent spoke image and improve the visibility of the deflections.

The operation is illustrated in Fig. 2 in which 17 and 18 represent the directional response characteristics of the antenna system when the dipole is respectively at the extreme right and extreme left positions, and A, B, and C represent the directions of a remote object. The direction A corresponds to the mean axis of the equipment which passes through the intersection of the directional response patterns of the antenna system. For a reflecting object in this direction the strength of the echoes is the same for each scanning position of the antenna system and the representation on the viewing screen is a wheel having spokes of equal length. When this representation is obtained, the operator knows that the equipment is pointed directly at the reflecting object. The direction B represents the condition in which the reflecting object is to the right of the mean axis of the equipment. For this condition echoes of maximum and minimum strength will be received when the scanning position of the antenna system is respectively to the right and to the left of the mean axis. The representation on the viewing screen for this condition is a wheel having a spoke of maximum length at the extreme right, a spoke of minimum length at the extreme left, with intermediate spokes of lengths varying sinusoidally between the maximum and minimum values. This representation on the viewing screen shown at B indicates to the operator that the elevation of the mean axis is correct but that the azimuth of the mean axis is to the left of the reflecting object. The representation indicated at A can be obtained by moving the azimuth control 7 in the direction to move the mean axis to the right until it coincides with the direction of the reflecting object. When the reflecting object lies along the direction C, a similar pattern is obtained on the viewing screen except that the spoke of maximum length is now at the extreme left and the spoke of minimum length is at the extreme right. Similar patterns would be obtained for other directions of the reflecting object. The spoke of maximum length indicates the direction in which the mean axis of the equipment should be moved to point at the target. By the use of a reflector of suitable dimensions behind the antenna a sharp beam may be produced having a half power width in the order of a few degrees. When the antenna is rotated to produce patterns 17 and 18, Fig. 2, and arranged so that the intersection is at a steep part of the directive curve, a small fraction of a degree of displacement of the target from the mean axis is sufficient to produce a perceptible difference in the signal strength as the beam traverses its path. Since the human eye is very sensitive to an appearance of symmetry in a visual pattern it readily detects a small departure from symmetry as the target moves away from the means axis. It has been found that with this representation of the relative strength of the echoes, it is very easy to point the equipment directly at a remote object. Different operators in manipulating the controls so as to obtain the representation in which all of the spokes are of equal length obtain settings of azimuth and elevation which differ by a small fraction of a degree.

In the use of the equipment, the operator determines the direction of the object selected by the range gate 15a by manipulating the azimuth and elevation controls until a symmetrical pattern is obtained on the viewing screen. The direction is then read from the position of the controls. If there is no polarization, the pattern indicating that the equipment is pointed directly at the object resembles a wheel with spokes of equal length. With polarization, which causes a second harmonic variation of the echo strength, the symmetrical pattern will have opposite spokes of equal length but the spokes of maximum and minimum length will be spaced apart.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States, is:

1. In a pulse echo locating system having an axis of orientation and an axis of maximum sensitivity to echoes from remote objects, said axis of maximum sensitivity extending at a small angle to said axis of orientation, means to rotate said axis of maximum sensitivity about said axis of orientation, a viewing screen, means to produce a spot on said screen and to move said spot about a circular trace thereon synchronously with movement of said axis of maximum sensitivity about said axis of orientation, and means to deflect said spot at right angles to said circular trace at regular intervals during its movement about said trace and to an extent dependent upon the intensity of echoes received in said system.

2. In a pulse echo locating system having an axis of orientation and an axis of maximum sensitivity to echoes from remote objects, said axis of maximum sensitivity extending at a small angle to said axis of orientation, means to rotate said axis of maximum sensitivity about said axis of orientation, a viewing screen, means to produce a spot on said screen and to move said spot about a circular trace thereon synchronously with movement of said axis of maximum sensitivity about said axis of orientation, and means to deflect said spot outwardly from said trace at regular intervals during its movement about said trace and to an extent dependent upon the intensity of received echoes whereby a figure is produced on said screen having outwardly extending spokes and having eccentricity in a direction dependent on the direction from which said echoes are received.

3. In a directive object locating equipment having an axis of orientation and an axis of maximum reception intersecting at a predetermined angle to each other, means to direct said first axis of orientation toward a remote energy-reflecting object from which reception is had, and to vary said second axis of maximum reception about said first axis, means to produce an indication having a center corresponding to said first axis and having points lying about said center in directions corresponding to the position of said second axis of maximum reception and at a distance corresponding to the range to said object, thereby to produce a substantially symmetrical figure about said center having a diameter of length corresponding to said range, and means responsive to received energy to produce indications in directions extending radially of said figure in directions corresponding to the instantaneous direction of said axis of maximum reception and to an extent dependent on the instantaneous intensity of energy received.

4. In a directive object locating system, having an axis of orientation and an axis of maximum sensitivity and means to orient said axis of orientation toward a remote energy-reflecting object, means to alternate said axis of maximum sensitivity to directions lying at opposite sides of said axis of orientation, an indicating device having a face, means to indicate the intensity of received energy when said axis of maximum sensitivity lies in each of said directions by lines extending in directions opposite from a point on said face and of length corresponding to the intensity of the energy received when said axis of maximum sensitivity lies in the corresponding direction from said axis of orientation, and means to space the end of both lines equally from said point on said face and by an amount corresponding to the range of said object.

5. In a directive locating system in which the axis of maximum sensitivity to received waves is rotated about the axis of orientation of the equipment, the combination, of a cathode ray device having a viewing screen, means to cause the ray of said device to transcribe a symmetrical circular trace on said screen synchronously with said rotation of said axis of maximum sensitivity, and means responsive to received waves to deflect said ray radially outward from said trace by an amount corresponding to the intensity of the received waves whereby a symmetrical figure is produced on said screen when said axis of orientation in the direction from which received waves arrive and said figure acquires an asymmetry when said axis of orientation lies at an angle to said direction from which received waves arrive, said asymmetry having a direction corresponding to the direction from which said received waves arrive.

6. In a pulse echo locating system, in which an axis of maximum sensitivity is rotated about an axis of orientation of the equipment at a rate such that a plurality of pulse echoes are received during each rotation, the combination of a cathode ray device having a viewing screen, means to deflect said ray to produce a symmetrical circular trace on said screen synchronously with rotation of said axis of sensitivity, and means responsive to each received echo to deflect said ray radially outward from said trace by an amount corresponding to the intensity of the respective echo thereby to impart an asymmetry to the figure produced on said screen by said ray indicative of the direction from which the received echoes arrive.

7. In a pulse echo locating system in which an axis of maximum sensitivity is rotated about an axis of orientation of the equipment at a rate such that a plurality of pulse echoes are received during each rotation, the combination of a cathode ray device having a viewing screen, means to deflect said ray to produce a symmetrical circular trace on said screen synchronously with rotation of said axis of sensitivity, means responsive to each received echo to deflect said ray radially outward from said trace by an amount corresponding to the intensity of the respective echo thereby to impart an asymmetry to the figure produced on said screen by said ray indicative of the direction from which the received echoes arrive, and means to vary the size of said symmetrical trace in accord with the range from which said echoes are received.

8. In radiant energy locating equipment, directional antenna means for scanning a conical field about the axis of orientation of said directional means, means for adjusting said axis toward a remote energy-reflecting object, a cathode ray device including a viewing screen and means for projecting an electron beam toward a point on said screen, means for selecting energy reflected from an object at a predetermined range from said equipment, and means controlled by said selecting means for deflecting said beam radially away from said point to a first position corresponding to the range to said object, means for rotating said beam position about said point in accordance with angular direction of said directional scanning means, and means for further deflecting said beam radially away from said first position to an extent dependent upon the strength of said energy received by said directional means at the corresponding angular scanning direction.

FRANKLIN G. PATTERSON.

REFERENCES CITED

The following references are of record in the file of this patent:

UNITED STATES PATENTS

| Number | Name | Date |
|---|---|---|
| 2,170,835 | Simon | Aug. 29, 1939 |
| 2,295,412 | Little | Sept. 8, 1942 |
| 2,405,930 | Goldberg et al. | Aug. 13, 1946 |
| 2,412,703 | Wolff | Dec. 17, 1946 |
| 2,424,984 | Hoffman | Apr. 5, 1947 |

FOREIGN PATENTS

| Number | Country | Date |
|---|---|---|
| 450,484 | Great Britain | July 20, 1936 |
| 503,471 | Great Britain | Apr. 6, 1939 |
| 542,634 | Great Britain | Jan. 21, 1942 |
| 635,793 | Germany | Sept. 10, 1936 |